(12) United States Patent
Hutchings et al.

(10) Patent No.: US 12,024,206 B2
(45) Date of Patent: Jul. 2, 2024

(54) TESTING SITUATIONAL AWARENESS OF DRIVERS TASKED WITH MONITORING A VEHICLE OPERATING IN AN AUTONOMOUS DRIVING MODE

(71) Applicant: Waymo LLC, Mountain View, CA (US)

(72) Inventors: Keith Hutchings, San Francisco, CA (US); Ilmo van der Lowe, Fremont, CA (US); Vasily Starostenko, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 674 days.

(21) Appl. No.: 16/928,630

(22) Filed: Jul. 14, 2020

(65) Prior Publication Data

US 2021/0291870 A1 Sep. 23, 2021

Related U.S. Application Data (60) Provisional application No. 62/991,225, filed on Mar. 18, 2020.

(51) Int. Cl.
*B60W 60/00* (2020.01)
*B60W 40/09* (2012.01)
*G09B 7/02* (2006.01)

(52) U.S. Cl.
CPC ........ *B60W 60/0053* (2020.02); *B60W 40/09* (2013.01); *G09B 7/02* (2013.01)

(58) Field of Classification Search
CPC ............. B60W 60/0053; B60W 40/09; B60W 30/18154; B60W 2540/21;

(Continued)

(56) References Cited

U.S. PATENT DOCUMENTS 10,146,221 B2 12/2018 Funakawa
2016/0046296 A1* 2/2016 Offenhaeuser ........ B60R 16/037
701/24

(Continued)

FOREIGN PATENT DOCUMENTS

JP    2019127238 A  *  8/2019
JP    2019127238 A      8/2019

(Continued)

OTHER PUBLICATIONS

International Search Report and Written Opinion for Application No. PCT/US21/22566 dated Jun. 28, 2021.

*Primary Examiner* — Peter D Nolan
*Assistant Examiner* — Peter Y Ning
(74) *Attorney, Agent, or Firm* — Botos Churchill IP Law (57) ABSTRACT

Aspects of the disclosure relate to testing situational awareness of a test driver tasked with monitoring the driving of a vehicle operating in an autonomous driving mode. For instance, a signal that indicates that the test driver may be distracted may be identified. Based on the signal, that a question can be asked of the test driver may be determined. A plurality of factors relating to a driving context for the vehicle may be identified. Based on the determination, a question may be generated based on the plurality of factors. The question may be provided to the test driver. Input may be received from the test driver providing an answer to the question.

22 Claims, 8 Drawing Sheets

(58) Field of Classification Search
CPC ... B60W 2540/229; B60W 2554/4046; B60W 40/08; B60W 2040/0818; B60W 2556/50; G09B 7/02
See application file for complete search history.

(56) References Cited

U.S. PATENT DOCUMENTS

| | | | | |
|---|---|---|---|---|
| 2017/0050642 | A1* | 2/2017 | Heckmann | G08G 1/163 |
| 2017/0220039 | A1* | 8/2017 | Funakawa | B60W 40/08 |
| 2017/0267251 | A1* | 9/2017 | Roberts | G08B 21/06 |
| 2018/0157980 | A1* | 6/2018 | Kochura | G06N 5/048 |
| 2019/0146491 | A1* | 5/2019 | Hu | G06F 3/017 |
| | | | | 701/27 |
| 2019/0366844 | A1* | 12/2019 | Yoon | A61B 5/18 |
| 2020/0012957 | A1* | 1/2020 | Yoon | G08B 25/10 |
| 2020/0118560 | A1* | 4/2020 | Kim | G10L 15/22 |
| 2020/0198644 | A1 | 6/2020 | Hutchings et al. | |
| 2021/0403019 | A1* | 12/2021 | Kim | B60W 50/14 |

FOREIGN PATENT DOCUMENTS

| | | |
|---|---|---|
| KR | 20190106937 A | 9/2019 |
| KR | 20200016055 A | 2/2020 |

* cited by examiner

TESTING SITUATIONAL AWARENESS OF DRIVERS TASKED WITH MONITORING A VEHICLE OPERATING IN AN AUTONOMOUS DRIVING MODE

CROSS REFERENCE TO RELATED APPLICATIONS

The present application claims the benefit of the filing date of U.S. Provisional Application No. 62/991,225, filed Mar. 18, 2020, the entire disclosure of which is incorporated by reference herein.

BACKGROUND

Autonomous vehicles, such as vehicles which do not require a human driver when operating in an autonomous driving mode, may be used to aid in the transport of passengers or items from one location to another. Testing of these vehicles typically involves a "test driver" who is tasked with monitoring the autonomous vehicle to ensure that the vehicle is operating safely. For instance, a person may be expected to monitor the vehicle and the vehicle's environment while the vehicle operates in the autonomous driving mode and to be ready to take control of the vehicle should the vehicle not be responding appropriately. Supervision of such vehicles is known to increase a person's susceptibility to fatigue, whether due to sleep deprivation, poor quality sleep, fatigue induced by the task itself, or the interaction of these contributing sources of fatigue. Furthermore, as the performance of autonomous vehicles improve, fewer interventions are by a human driver, the likelihood of fatigue in human test drivers increases.

SUMMARY

One aspect of the disclosure provides a method of testing situational awareness of a test driver tasked with monitoring a vehicle operating in an autonomous driving mode. The method includes identifying, by one or more processors, a signal that indicates that the test driver may be distracted; based on the signal, determining, by the one or more processors, that a question can be asked of the test driver; identifying, by the one or more processors, a plurality of factors relating to a driving context for the vehicle; based on the determination, generating, by the one or more processors, a question based on the plurality of factors; providing, by the one or more processors, the question to the test driver; and receiving, by the one or more processors, input from the test driver providing an answer to the question.

In one example, the method also includes identifying a second signal indicating that the test driver may not be distracted, and wherein determining that a question can be asked is further based on the second signal. In this example, the second signal includes the test driver inputting feedback about the vehicle's driving into a user input device. In alternatively, the second signal includes the test driver taking manual control of the vehicle. As another alternative, the second signal includes the test driver inputting details about an object in an environment of the vehicle into a user input device.

In another example, the signal relates to a lack of feedback input into a user input device of the vehicle after a certain type of event. In another example, the signal relates to feedback input into a first user input device of the vehicle after a certain type of event that is inconsistent with feedback input into a first user input device by a passenger of the vehicle after the certain type of event. In another example, the signal relates to a lack of feedback input into a first user input device of the vehicle after a certain type of event when there is feedback input device by a passenger of the vehicle after the certain type of event. In another example, the determining that a question can be asked is further based on whether a threshold number of signals that indicates that the test driver may be distracted have been identified. In another example, the determining that a question can be asked is further based on whether pre-stored map information indicates that the vehicle is currently within an area where questions are not to be asked. In another example, the determining that a question can be asked is further based on a current speed of the vehicle. In another example, the determining that a question can be asked is further based on a number of road users detected in an environment of the vehicle. In another example, the determining that a question can be asked is further based on whether another object in an environment of the vehicle is performing a certain type of maneuver. In another example, the determining that a question can be asked is further based on whether the vehicle is performing a certain type of maneuver. In another example, the plurality of factors is identified further based on objects detected by a perception system of the vehicle. In another example, the plurality of factors is identified further based on pre-stored map information used to control the vehicle in the autonomous driving mode. In another example, the generating the question includes generating an answer to the question based on the plurality of factors.

In another example, the generating the question includes: identifying an initial set of predefined questions; ranking the initial set; and selecting the question from the ranked initial set. In this example, the ranking is based on predetermined values associated with the predefined questions. In addition, the predetermined values correspond to difficulty of questions. In addition, the ranking is further based on an amount of time expected to be available to ask and receive user input providing an answer to the question. In another example, the method also includes processing the input to determine whether the answer was correct. In this example, the method also includes initiating an intervention response based on the determination of whether the answer was correct. In addition or alternatively, the method also includes sending the determination of whether the answer was correct to a remote computing device.

DETAILED DESCRIPTION

Overview

The technology relates to preventing fatigue events in persons who are tasked with monitoring the driving of a vehicle operating in an autonomous driving mode. For instance, a person may be expected to monitor the vehicle and the vehicle's environment while the vehicle operates in the autonomous driving mode and be ready to immediately take control of the vehicle should the vehicle not be responding appropriately. Fatigue can result in fatigue events where a person becomes inattentive, closes his or her eyes, or even falls asleep. In other situations, merely being inattentive while monitoring the vehicle can result in a dangerous situation. As such, it is critically important to ensure that autonomous vehicle operators remain attentive and are capable of continuing such monitoring and to intervene if needed.

In order to do so, a person tasked with monitoring a vehicle or a "test driver" may be asked questions about the context in which the vehicle is currently driving by a testing system. While situational awareness and fatigue are distinct from one another, in many instances a lack of situational awareness may be caused by fatigue. In addition, a lack of situational awareness can be caused by distractedness or other situations in which it may no longer be appropriate for a test driver to continue on the task. In other words, by asking questions related to the context in which the vehicle is driving in real time, the test driver's lack of situational awareness or distractedness can be flagged and responded to as needed.

Before it is appropriate or even useful to ask a question, one or more signals which may suggest distractedness or not distractedness may be identified. The combination of not distracted and distracted signals may then be used in combination with additional factors to determine if it is appropriate to ask a question.

Once it is determined that a question can be asked, the vehicle's computing devices must actually generate that question. The questions themselves may be predetermined, that is questions may be determined in advance. One or more of the predetermined questions may be selected based upon the current driving context of the vehicle and/or mapped information. Once a question is identified, it can be presented to the driver in any number of ways. The test driver's answers may also be inputted in various ways.

The inputted answer may be processed by the vehicle's computing devices and then sent to a remote computing device or simply sent to a remote computing device to be processed. The processing may involve determining whether the answer was correct as well as a reaction time for the test driver inputting the answer. Based on the processing and/or grading, an intervention may be initiated.

The features described herein may provide for a reliable and effective system for identifying and responding to distracted or with insufficient situational awareness persons tasked with monitoring the driving of a vehicle operating in an autonomous driving mode.

Example Systems

Figure 1:
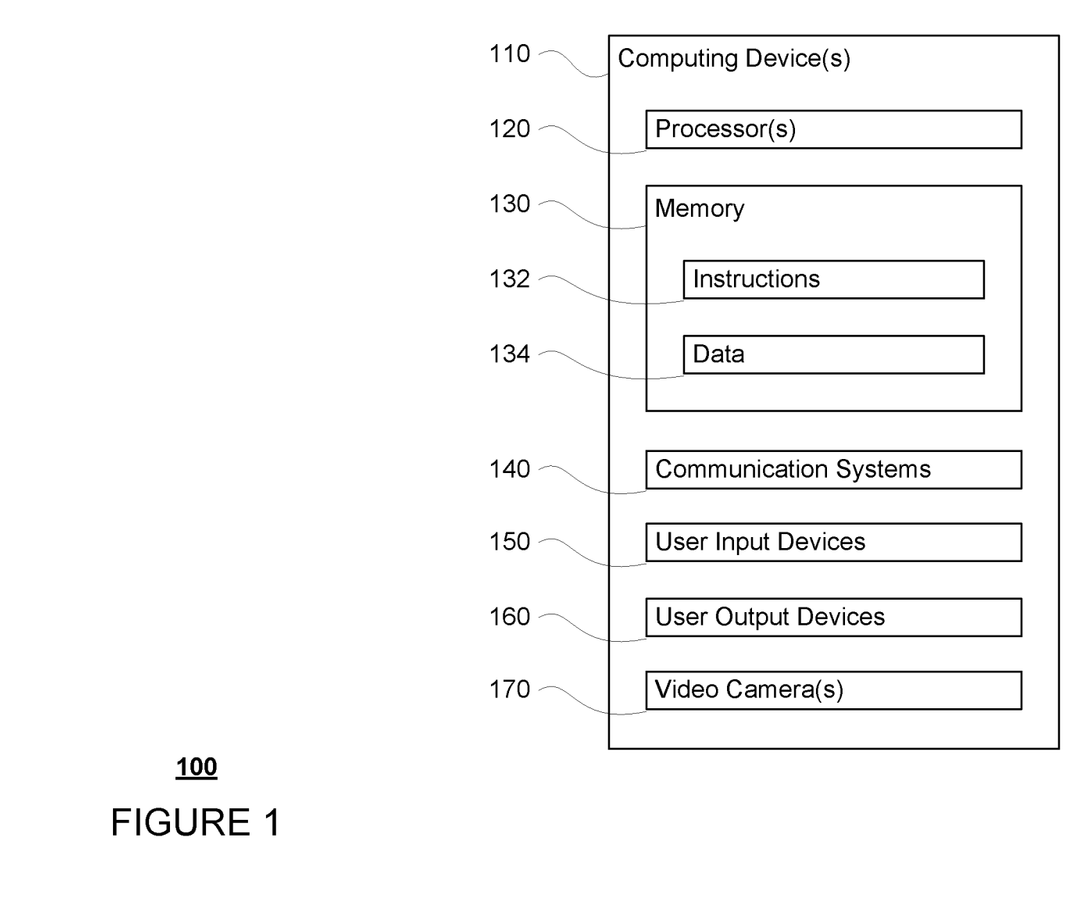
FIG. 1 is an example of a driver testing system in accordance with aspects of the disclosure.

A driver testing system 100 may include one or more computing devices 110 having one or more processors 120 and memory 130 storing instructions 132 and data 134. The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing device 110 may include one or more video cameras 170 which may be configured to capture video and/or still images of a test driver. The computing device 110 may also include user output devices 160, such as a display and/or speaker, as well as a user input devices 150, such as a touchscreen, button(s), microphones, etc. in order to enable a driver to input information into the computing device 110 and/or communicate with a remote operator. Such features may be used to enable a remote operator to "check-in" on a driver as well as to enable two-way communications between the remote operator and the driver. In some instances, the output device and the user input device may be the same device (e.g. a touchscreen).

Figure 2:
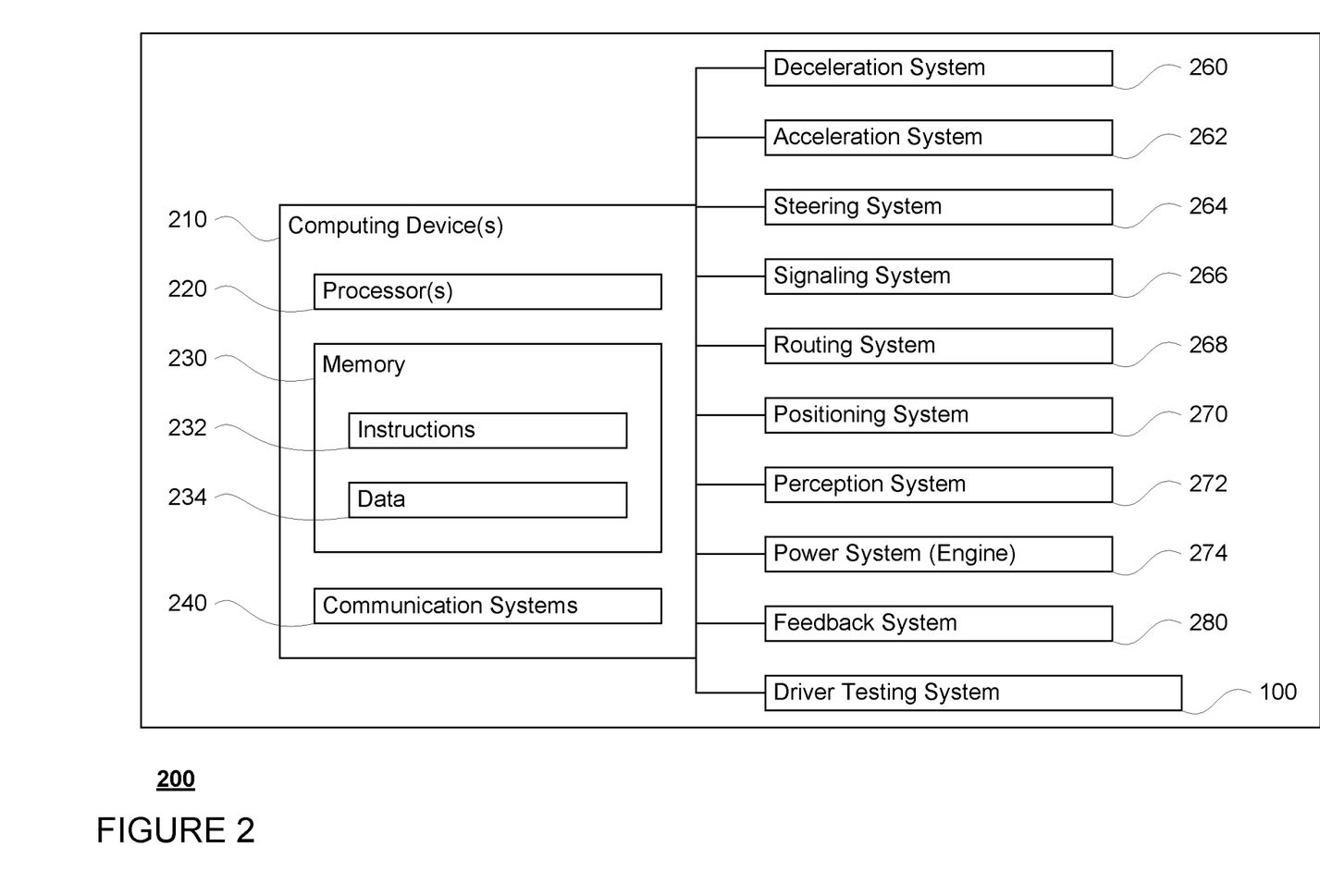
FIG. 2 is a functional diagram of an example vehicle in accordance with an exemplary embodiment.

The driver testing system 100 may also include a communications system 140 that enables the driver testing system 100 to communicate with other computing devices such as the computing devices 210, 510, 520, 530, 540 or other systems of vehicle 200, such as deceleration system 260, acceleration system 262, steering system 264, routing system 266, planning system 268, positioning system 270, and perception system 272 discussed in more detail below. For example, the communication system 140 may include wired and/or wireless connections (such as transmitters and receivers), that enable the driver testing system 100 to communicate with other computing devices. As an example, the communications system may enable the driver testing system to use various protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Figure 3:
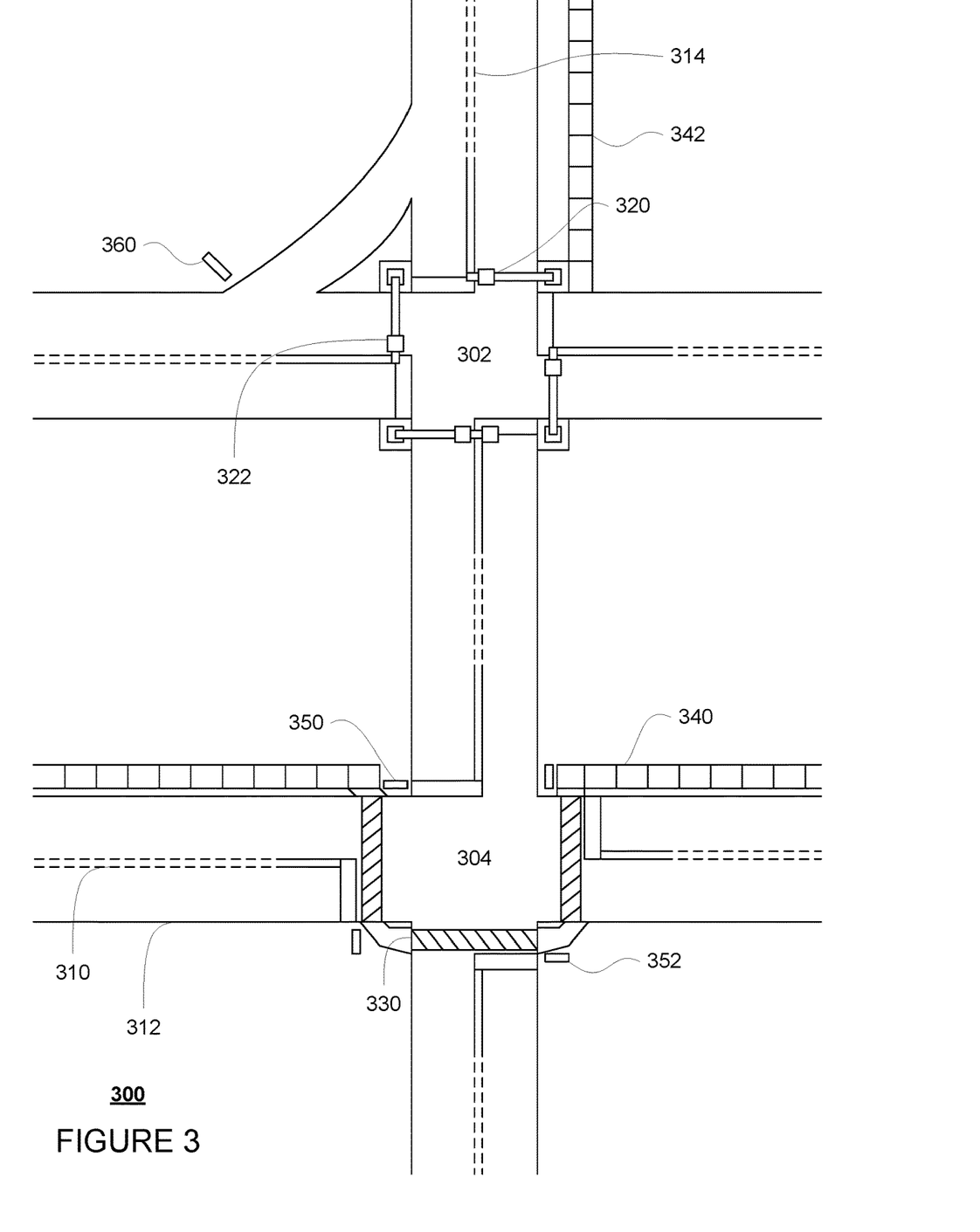
FIG. 3 is an example of map information in accordance with aspects of the disclosure.

As noted above, the driver testing system may be employed within a vehicle having an autonomous driving mode. FIG. 2 is an example block diagram of a vehicle 200, and FIG. 3 is an example view of the vehicle 200. In this example, the vehicle 200 is a vehicle having an autonomous driving mode as well as one or more additional driving modes, such as a semiautonomous or manual driving mode. While certain aspects of the disclosure are particularly useful in connection with specific types of vehicles, the vehicle may be any type of vehicle including, but not limited to, cars, trucks, motorcycles, buses, recreational vehicles, etc.

Turning to FIG. 2, the computing devices 110 of the driver testing system may be in communication with one or more computing devices 210 of the vehicle. As shown, the driver testing system may be incorporated into the vehicle 200 and may also be incorporated into the computing devices 210.

The one or more computing devices 210 may include one or more processors 220, memory 230 storing instructions 232 and data 234, and other components typically present in general purpose computing devices. These processors, memory, instructions and data may be configured the same or similarly to the processors 120, memory 130, instructions 132, and data 134.

In one aspect the computing devices 210 may be part of an autonomous control system capable of communicating with various components of the vehicle in order to control the vehicle in an autonomous driving mode. For example, returning to FIG. 2, the computing devices 210 may be in communication with various systems of vehicle 200, such as deceleration system 260, acceleration system 262, steering system 264, routing system 266, planning system 268, positioning system 270, and perception system 272 in order to control the movement, speed, etc. of vehicle 200 in accordance with the instructions 232 of memory 230 in the autonomous driving mode.

As an example, computing devices 210 may interact with deceleration system 260 and acceleration system 262 in order to control the speed of the vehicle. Similarly, steering system 264 may be used by computing devices 210 in order to control the direction of vehicle 200. For example, if vehicle 200 is configured for use on a road, such as a car or truck, the steering system may include components to control the angle of wheels to turn the vehicle.

Planning system 268 may be used by computing devices 210 in order to determine and follow a route generated by a routing system 266 to a location. For instance, the routing system 266 may use pre-stored map information to determine a route from a current location of the vehicle to a drop off location. The planning system 268 may periodically generate trajectories, or short-term plans for controlling the vehicle for some period of time into the future, in order to follow the route (a current route of the vehicle) to the destination. In this regard, the planning system 268, routing system 266, and/or data 234 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIG. 3 is an example of map information 300 for a section of roadway including intersections 302, 304. The map information 300 may be a local version of the map information stored in the memory 230 of the computing devices 210. In this example, the map information 300 includes information identifying the shape, location, and other characteristics of lane lines 310, 312, 314, traffic lights 320, 322, crosswalks 330, sidewalks 340, stop signs 350, 352, and yield sign 360. In this regard, the map information includes the three-dimensional (3D) locations of traffic lights 320, 322 as well as information identifying the lanes which are controlled by these traffic lights.

While the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 270 may be used by computing devices 210 in order to determine the vehicle's relative or absolute position on a map or on the earth. For example, the positioning system 270 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 270 may also include other devices in communication with the computing devices of the computing devices 210, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 210, other computing devices and combinations of the foregoing.

The perception system 272 also includes one or more components for detecting objects external to the vehicle such as other vehicles, obstacles in the roadway, traffic signals, signs, trees, etc. For example, the perception system 272 may include lasers, sonar, radar, cameras and/or any other detection devices that record data which may be processed by the computing devices of the computing devices 210. In the case where the vehicle is a passenger vehicle such as a minivan, the minivan may include a laser or other sensors mounted on the roof or other convenient location.

Figure 4:
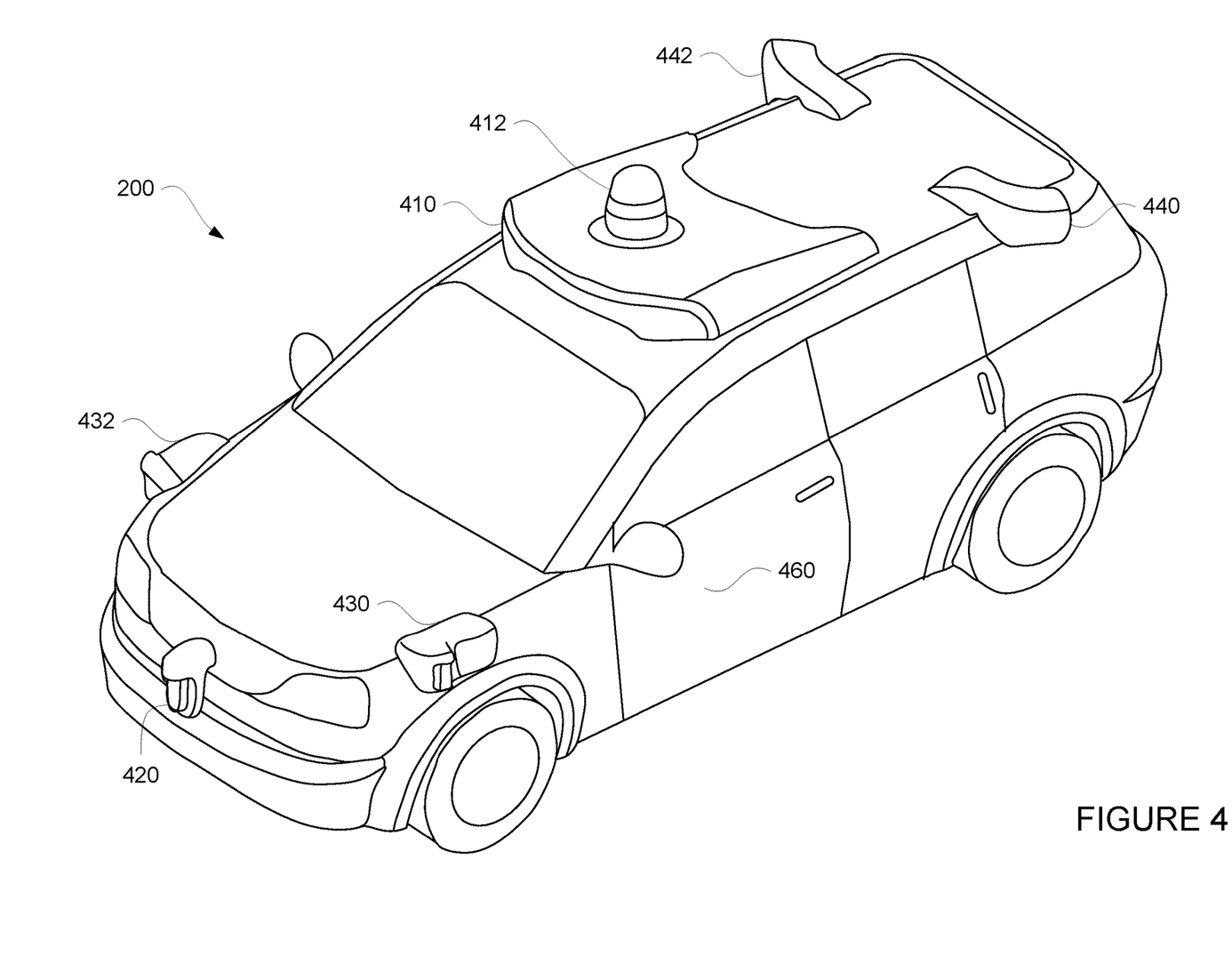
FIG. 4 is an example external view of a vehicle in accordance with aspects of the disclosure.

For instance, FIG. 4 is an example external view of vehicle 200. In this example, roof-top housing 410 and dome housing 412 may include a LIDAR sensor as well as various cameras and radar units. In addition, housing 420 located at the front end of vehicle 200 and housings 430, 432 on the driver's and passenger's sides of the vehicle may each store a LIDAR sensor. For example, housing 430 is located in front of driver door 460. Vehicle 200 also includes housings 440, 442 for radar units and/or cameras also located on the roof of vehicle 200. Additional radar units and cameras (not shown) may be located at the front and rear ends of vehicle 200 and/or on other positions along the roof or roof-top housing 410.

The computing devices 210 may be capable of communicating with various components of the vehicle in order to control the movement of vehicle 200 according to primary vehicle control code of memory of the computing devices 210. For example, returning to FIG. 2, the computing devices 210 may include various computing devices in communication with various systems of vehicle 200, such as deceleration system 260, acceleration system 262, steering system 264, routing system 266, planning system 268, positioning system 270, perception system 272, and power system 274 (i.e. the vehicle's engine or motor) in order to control the movement, speed, etc. of vehicle 200 in accordance with the instructions 232 of memory 230.

The various systems of the vehicle may function using autonomous vehicle control software in order to determine how to and to control the vehicle. As an example, a perception system software module of the perception system 272 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. Each of these detection system software modules may input sensor data generated by the perception system 272 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 270 identifying the location and orientation of the vehicle, a destination for the vehicle as well as feedback from various other systems of the vehicle may be input into a planning system software module of the planning system 268. The planning system may use this input to generate trajectories for the vehicle to follow for some brief period of time into the future based on a current route of the vehicle generated by a routing module of the routing system 266. A control system software module of the computing devices 210 may be configured to control movement of the vehicle, for instance by controlling braking, acceleration and steering of the vehicle, in order to follow a trajectory.

Computing devices 210 may also include communication systems such as one or more wired or wireless network connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 210 may control the vehicle in an autonomous driving mode by controlling various components. For instance, by way of example, the computing devices 210 may navigate the vehicle to a destination location completely autonomously using data from the detailed map information and planning system 268. The computing devices 210 may use the positioning system 270 to determine the vehicle's location and perception system 272 to detect and respond to objects when needed to reach the location safely. Again, in order to do so, computing device 210 may generate trajectories and cause the vehicle to follow these trajectories, for instance, by causing the vehicle to accelerate (e.g., by supplying fuel or other energy to the engine or power system 274 by acceleration system 262), decelerate (e.g., by decreasing the fuel supplied to the engine or power system 274, changing gears, and/or by applying brakes by deceleration system 260), change direction (e.g., by turning the front or rear wheels of vehicle 200 by steering system 264), and signal such changes (e.g. by using turn signals). Thus, the acceleration system 262 and deceleration system 260 may be a part of a drivetrain that includes various components between an engine of the vehicle and the wheels of the vehicle. Again, by controlling these systems, computing devices 210 may also control the drivetrain of the vehicle in order to maneuver the vehicle autonomously.

As shown in FIG. 2, the vehicle 200 may also include a feedback system 280. The feedback system 280 may include various user input devices and user output devices, such as the user input devices 150 and user output devices 160 of the driver testing system 100, which enable the test driver and/or any passengers of the vehicle to provide feedback about the vehicle's environment and/or driving experience. For example, the test driver and/or a passenger may report information about how comfortable a ride is, identify certain uncomfortable events, etc. In some instances, the feedback system 280 may be incorporated into the driver testing system or may be a completely separate system (as depicted in FIG. 2).

The computing devices 210 may include a communications system 240 which may be the same or similar to communications system 140. The communications system may enable the computing devices 210 to communicate with other devices remote from the vehicle. In this way, information from the driver testing system 100 may be sent to remote devices. As such, the driver testing system may 100 be able to communicate with the computing devices 210 of the vehicle as well as various remote computing devices, such as those computing devices that are a part of the autonomous vehicle service as well as other computing devices, either directly or indirectly via the computing devices of the vehicle.

Figure 5:
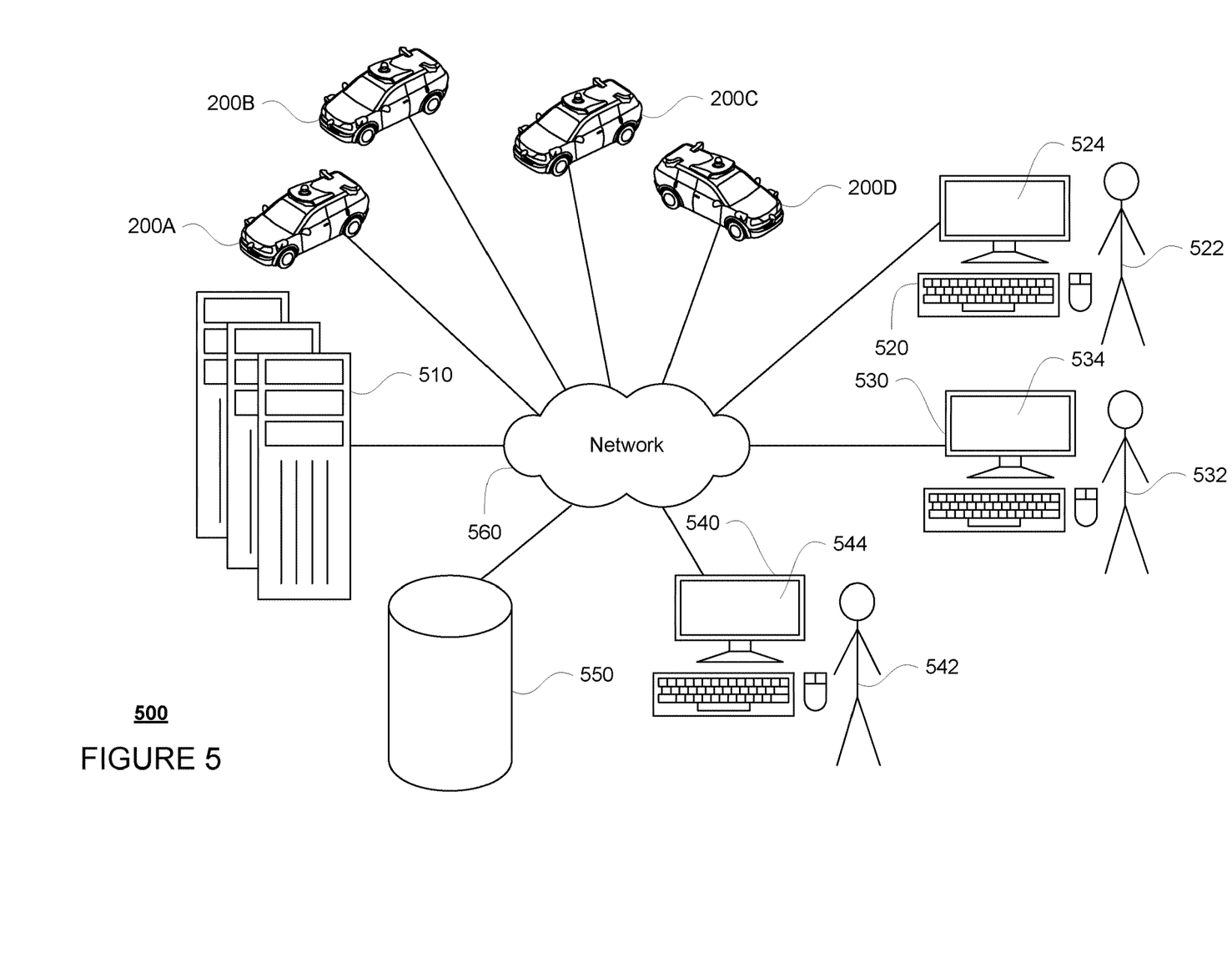
FIG. 5 is an example pictorial diagram of a system in accordance with aspects of the disclosure.
Figure 6:
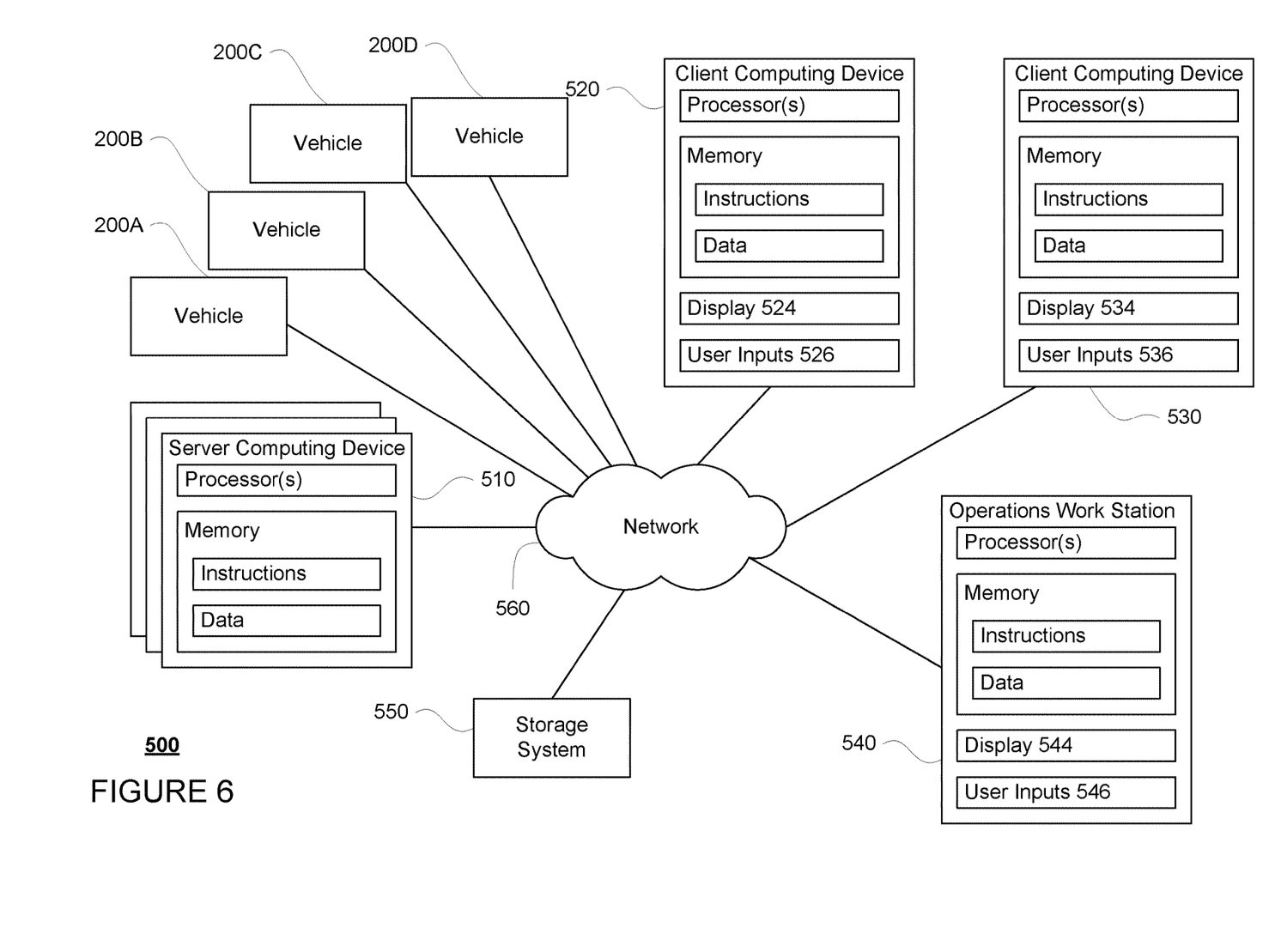
FIG. 6 is an example block diagram of the system of FIG. 5.

FIGS. 5 and 6 are pictorial and functional diagrams, respectively, of an example system 500 that includes a plurality of computing devices 510, 520, 530, 540 and a storage system 550 connected via a network 560. System 500 also includes vehicles 200A, 200B, 200C, 200D, which may be configured the same as or similarly to vehicle 200. Although only a few vehicles and computing devices are depicted for simplicity, a typical system may include significantly more.

As shown in FIG. 5, each of computing devices 510, 520, 530, 540 may include one or more processors, memory, data and instructions. Such processors, memories, data and instructions may be configured similarly to one or more processors 120, memory 130, data 134, and instructions 132 of computing device 110.

The network 560, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Again, communication may be facilitated by any device capable of transmitting data to and from other computing devices, such as modems and wireless interfaces.

In one example, one or more computing devices 510 may include one or more server computing devices having a plurality of computing devices, e.g., a load balanced server farm, that exchange information with different nodes of a network for the purpose of receiving, processing and transmitting the data to and from other computing devices. For instance, one or more computing devices 510 may include one or more server computing devices that are capable of communicating with computing device 210 of vehicle 200 or a similar computing device of other vehicles as well as computing devices 520, 530, 540 via the network 560. For example, each of the vehicles 200A, 200B, 200C, 200D, may correspond to vehicle 200 and may be a part of a fleet of vehicles of the autonomous vehicle service that can be dispatched by server computing devices 510 to various locations. In this regard, the server computing devices 510 may function (in conjunction with storage system 550) as a dispatching system for the autonomous vehicle service which can be used to dispatch vehicles such as vehicle 200 and vehicle 200A to different locations in order to pick up and drop off passengers. In addition, server computing devices 510 may use network 560 to transmit and present information to a person, such as human operators 522, 532, 542 on a display, such as displays 524, 534, 544 of computing devices 520, 530, 540. In this regard, computing devices 520, 530, 540 may be considered client computing devices.

As shown in FIG. 6, each client computing device 520, 530, 540 may be a personal computing device intended for use by a human operator 522, 532, 542, and have all of the components normally used in connection with a personal computing device including a one or more processors (e.g., a central processing unit (CPU)), memory (e.g., RAM and internal hard drives) storing data and instructions, a display such as displays 524, 534, 544 (e.g., a monitor having a screen, a touch-screen, a projector, a television, or other device that is operable to display information), and user input devices 526, 536, 546 (e.g., a mouse, keyboard, touchscreen or microphone). The client computing devices may also include a camera for recording video streams, speakers, a network interface device, and all of the components used for connecting these elements to one another.

Although the client computing devices 520, 530, and 540 may each comprise a full-sized personal computing device, they may alternatively comprise mobile computing devices capable of wirelessly exchanging data with a server over a network such as the Internet. By way of example only, the client computing devices may include a mobile phone or a device such as a wireless-enabled PDA, a tablet PC, a wearable computing device or system, or a netbook that is capable of obtaining information via the Internet or other networks.

Each of the client computing devices may be a remote monitoring workstation used by a person (e.g. human operators 522, 532, 542) to provide concierge or remote assistance services to test drivers of vehicles 200A, 200B, 200C, 200D. For example, a human operator 542 may use the remote monitoring workstation 540 to communicate via a telephone call or audio connection with people through their respective client computing devices or vehicles 200A, 200B, 200C, 200D, in order to ensure the safe operation of these vehicles and the safety of the test drivers as described in further detail below. Although only a few remote monitoring workstations are shown in FIGS. 5 and 6, any number of such workstations may be included in a typical system.

As with memory 130, storage system 550 can be of any type of computerized storage capable of storing information accessible by the server computing devices 510, such as a hard-drive, memory card, ROM, RAM, DVD, CD-ROM, write-capable, and read-only memories. In addition, storage system 550 may include a distributed storage system where data is stored on a plurality of different storage devices which may be physically located at the same or different geographic locations. Storage system 550 may be connected to the computing devices via the network 560 as shown in FIGS. 5 and 5, and/or may be directly connected to or incorporated into any of the computing devices 510, 520, 530, 540, etc.

The storage system 550 may be configured to store various information including videos, driver drowsiness values, radio button selections, thresholds, test driver information, human operator information, reliability scores for human operators, intervention or fatigue event information, models, model data (e.g. parameters), etc. as discussed further below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
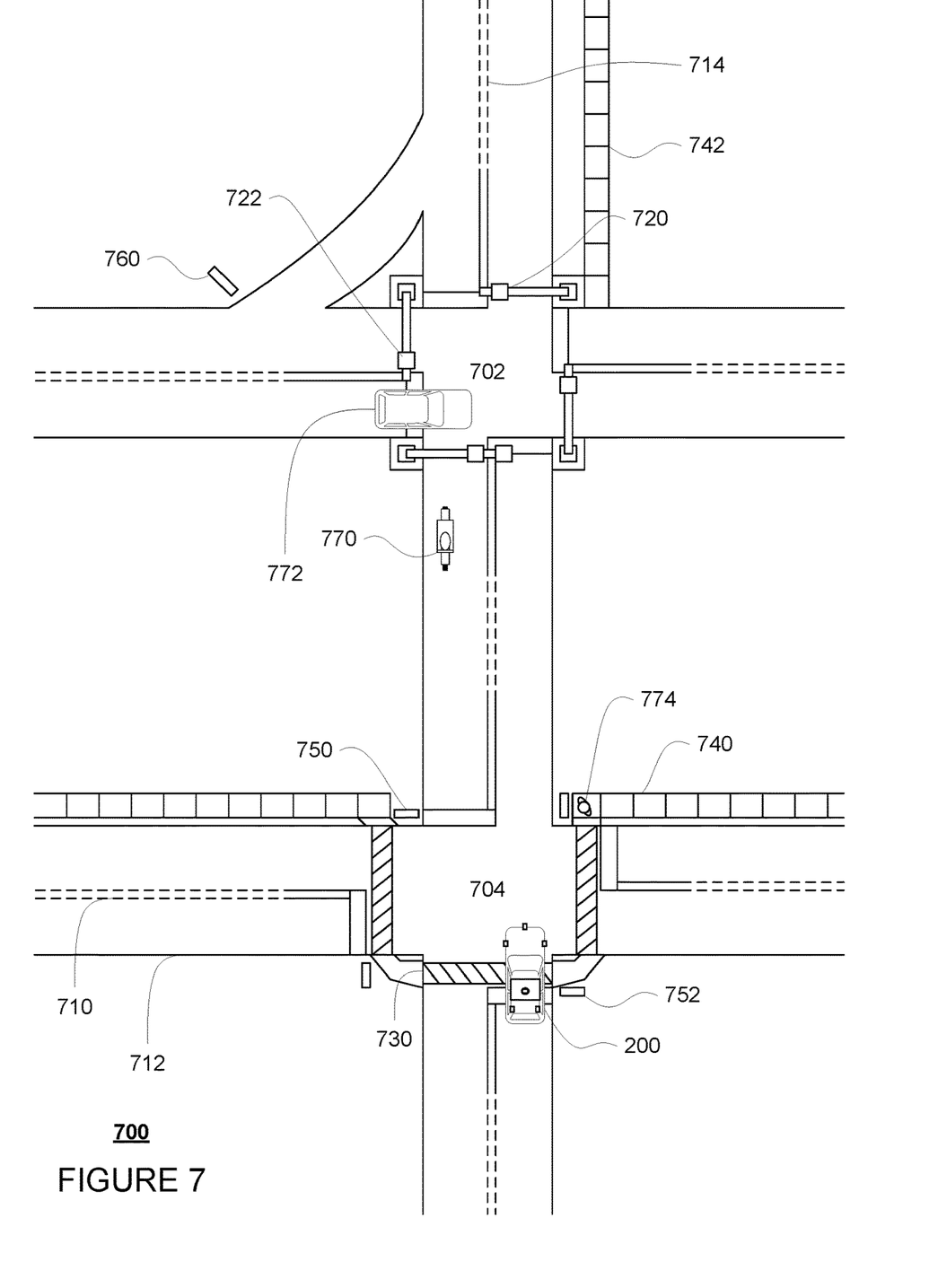
FIG. 7 is an example of a vehicle driving in a geographic area in accordance with aspects of the disclosure.

For the purposes of demonstration, FIG. 7 depicts vehicle 200 being maneuvered on a section of roadway 700 including intersections 702, 704. In example of FIG. 7, intersections 702 and 704 correspond to intersections 302 and 304 of the map information 300, respectively. In this example, lane lines 710, 712, 714 correspond to the shape, location, and other characteristics of lane lines 310, 312, 314, respectively. Similarly, crosswalk 730 corresponds to the shape, location, and other characteristics of crosswalk 330, respectively; sidewalks 740, 742 correspond to sidewalks 340, 342; traffic lights 720, 722 correspond to traffic lights 320, 322, respectively; stop signs 750, 752 correspond to stop signs 350, 352, respectively; and yield sign 760 corresponds to yield sign 360.

In this example, vehicle 200 is entering intersection 704 and approaching intersection 702. The perception system 272 may detect and identify various objects in the vehicle's environment including those features identified above which correspond to features of the map information as well as other objects such as other road users including vehicle 772, bicyclist 770, and pedestrian 774.

Figure 8:
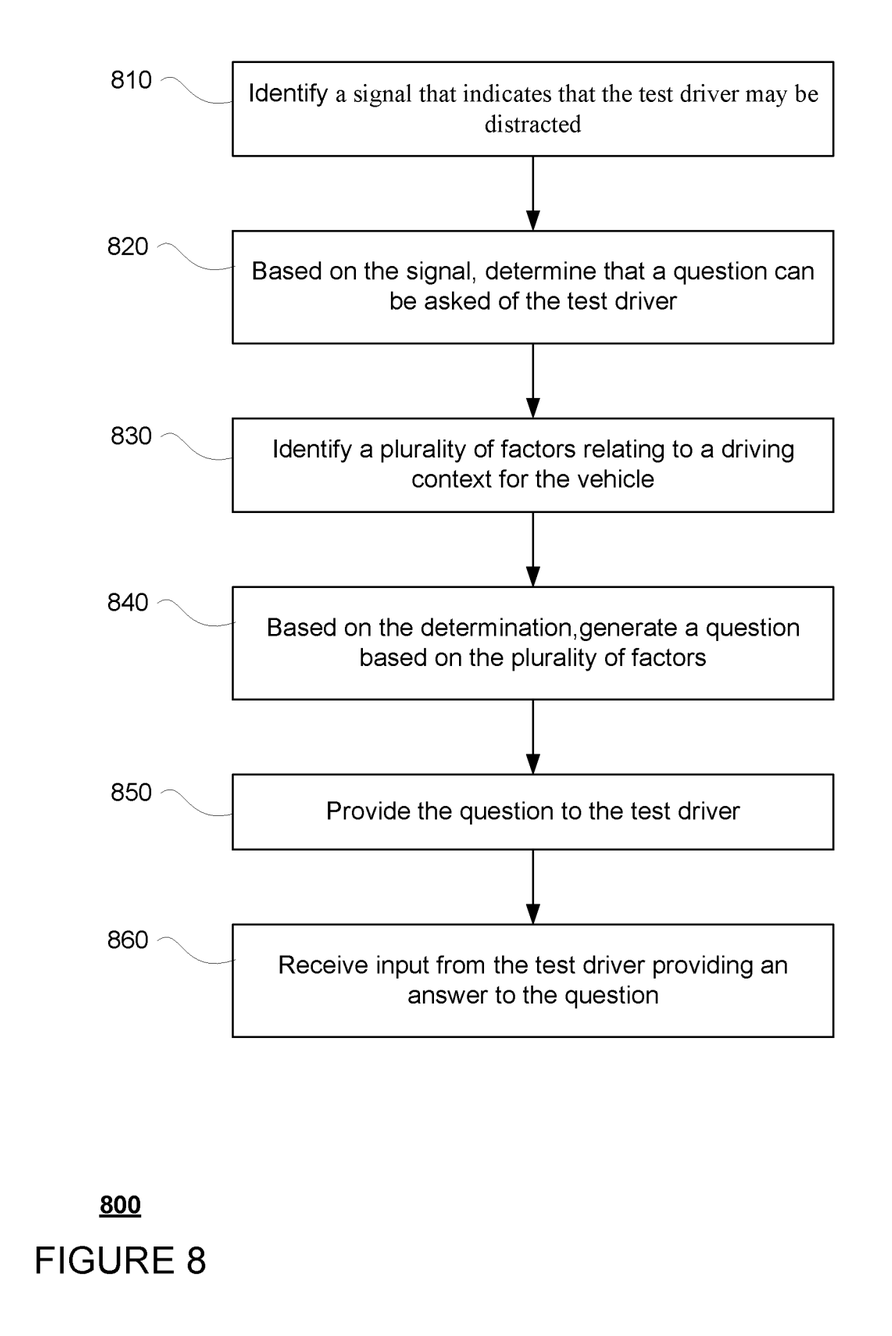
FIG. 8 is an example flow diagram in accordance with aspects of the disclosure.

FIG. 8 is an example flow diagram 800 for testing situational awareness of a test driver tasked with monitoring the driving of a vehicle operating in an autonomous driving mode. The blocks of FIG. 8 may be performed by one or more processors of one or more computing devices, such as processors 120 of computing devices 110 of the driver testing system 100. For instance, at block 810, a signal that indicates that the test driver may be distracted is identified.

One or more signals which may suggest distractedness or not distractedness may be identified by the driver testing system 100. In this regard, as noted above, the driver testing system 100 may be in communication with (or simply receive information from) the feedback system 280. For instance, if a test driver takes manual control of an aspect of the vehicle such as the braking, accelerating, steering, etc., this may actually indicate that the test driver is situationally aware or aware of the driving context. In other instances, if the test driver inputs feedback about the vehicle's driving into the feedback system 280, this may also indicate that the test driver is situationally aware. This may be especially true in certain types of situations in which a test driver is identifying types of objects (e.g. identifying a pedestrian as an adult or a child) in order to enable later refinements (e.g. machine learning and training) to the vehicle's classification systems. In still other instances of feedback, test drivers may input information about certain types of situations such as in response to a hard braking or swerving event, such as those that are over some threshold or would make the test driver or any passengers feel physically uncomfortable. Again, this feedback may suggest that the test driver is aware of the driving context.

However, the lack of such feedback for certain types of situations may be considered a signal a test driver is distracted or his or her situational awareness may be reduced. Such signals may be used by themselves or in probabilistic ways to determine whether a test driver may be distracted. For instance, if in a given situation where a vehicle has passed through 3 intersections, if an average test driver would have been 90% likely to give feedback, but no feedback has been received, this may suggest that the test driver is distracted. Of course, the efficacy of such probabilistic determinations may drop off as the driving of autonomous vehicles improves.

In addition, test driver feedback may be combined with passenger feedback to identify a signal that a test driver may be distracted or not situationally aware. For example, if a passenger provided feedback about a certain type of situation such as a certain type of vehicle maneuver but the test driver did not, this may indicate that the test driver is distracted or not situationally aware. Similarly, if the feedback from the test driver and the customer are opposite of one another (i.e. opposite ends of a feedback scale or otherwise inconsistent), this may also indicate that the test driver is distracted or rather, that the test driver's situational awareness has lessened or is below a sufficiently safe level. In this regard, because the test driver is tasked with monitoring the safety of the vehicle, the feedback from any passengers may be considered to be a baseline for the test driver because the passenger is unlikely to be able to take control of the vehicle if needed.

Returning to FIG. 8 at block 820, based on the signal, that a question can be asked of the test driver is determined. The combination of not distracted and distracted signals may be used in combination with additional factors to determine if it is appropriate to ask a question. For instance, it may be enough that only one distracted signal is identified before asking a question. In other cases, there may be some threshold of signals (e.g. more than 2 distracted signals in the last minute) or some more complex combinations in conjunction with such a threshold (e.g. if there are two not distracted signals within 30 seconds of a distracted signal, these may "cancel" out the distracted signal).

In addition, before asking a question, it may be critically important for the driver testing system 100 to consider additional factors (e.g. those other than the aforementioned signals) before asking a question. This is because asking a question may increase the cognitive load on a test driver and can in itself cause distractedness or a lack of situational awareness. In other words, the need to ask a question must be balanced with the risk of something dangerous occurring if the question causes the test driver to become distracted or not situationally aware. These additional factors may include, for instance, details of the map information for the area in which the vehicle is currently driving (e.g. map information 300), the vehicle's current speed (e.g. it may not be safe to ask questions when the vehicle is going more than 15 miles per hour or it may only be considered safe when the vehicle is stopped), the objects around the vehicle (e.g. it may not be safe to ask questions when there is a large number of other vehicles, pedestrians or bicyclists nearby, etc.), the behaviors of other objects around the vehicle (e.g. it may not be safe to ask questions when other objects are passing or changing lanes), whether the vehicle is engaged in a particular maneuver (e.g. it may not be safe to ask questions when the vehicle turning, yielding, passing, etc.), etc. To enable such features, as noted above, the driver testing system may be in communication with (or simply receive information from) the computing devices 210 or other systems of vehicle 200, such as deceleration system 260, acceleration system 262, steering system 264, routing system 266, planning system 268, positioning system 270, and perception system 272.

For example, turning to FIG. 7, if the pedestrian 774 is approaching intersection 704, the point in time represented in FIG. 7 may not be an appropriate time to ask a question of the test driver. However, if the pedestrian 774 is moving away from the intersection 704, the point in time represented in FIG. 7 may be an appropriate time to ask a question of the test driver. In other instances, the driver testing system 100 may need to wait until the vehicle has passed the pedestrian 774 before asking a question of the test driver.

In addition, the details of the map information may identify certain areas where questions cannot be asked, such as high-traffic areas, or areas where test drivers and/or passengers typically provide feedback. In this regard, the vehicle may need to exit such areas before a question is asked. At the same time, if the vehicle is approaching such an area, the time before reaching such an area may be appropriate for asking a question (e.g. 0.25 miles before entering a school zone).

At block 830, a plurality of factors relating to a driving context for the vehicle are identified, and based on the determination, a question is generated based on the plurality of factors at block 840. In other words, once it is determined that a question can be asked, the vehicle's computing devices must actually generate that question.

The questions themselves may be predetermined, that is questions may be determined in advance, that is pre-defined, and pre-stored in the memory 130. For example, questions may request the test driver to identify the number of stop signs at an intersection that the vehicle has passed through, the number of vehicles in front of the vehicle, the number of pedestrians present, whether there is a bicyclist present, whether the vehicle passed an intersection with a traffic light, the number of lanes on the road with the same direction of traffic as the vehicle, etc. Other questions may be generated based on the vehicle's behavior, such as whether the vehicle changed lanes or made a left or right turn in the prior 30 seconds. As an example, referring to FIG. 7, questions may include, "is there a pedestrian proximate to intersection 704?", "is there a bicyclist present?", "is there a vehicle in intersection 702?", "did the vehicle stop for the stop sign?", etc. Other types of questions may be created specific to other road rules or events such as "which emergency vehicle have you just passed?", "did the vehicle violate the move over law?", examples of road rule events may include temporary speed sign violations, wrong side of road events, move over law violations, incorrect reactions to pedestrians in crosswalks, bicyclist related events, etc. In this regard, the questions themselves may be relatively short, have simple yes, no or numerical answers in order to limit the cognitive load on the test driver resulting from the question.

One or more of the predetermined questions may be selected based upon the current driving context of the vehicle and/or pre-stored map information. For instance, if the vehicle's map information 300 and perception system 272 identify different combinations of features are present, these may be used to identify an initial set of questions that are appropriate in the current context in which the vehicle is (or just was) driving. Once an initial set of questions (and corresponding answers) is identified, these questions may be ranked, and the highest ranked question may be selected to be asked of the test driver. In this regard, the vehicle's computing devices may have already compiled answers before asking questions.

For instance, each of the pre-stored questions may be associated with a predetermined ranked value. The ranked value may be used to identify a highest ranked question. For instance, the questions noted above may be ranked (1) "is there a pedestrian proximate to intersection 704?", (2) "is there a bicyclist present?", (3) "is there a vehicle in intersection 702?", (4) "did the vehicle stop for the stop sign?" based on their importance to indicating the situational awareness of the test driver for vehicle 200. Of course, other ranking orders for similar questions may also be used as discussed further below.

In some instances, incorrect or delayed answers to an "easier" question may be more predictive of fatigue than incorrect or delayed answers to a "difficult" question. Similarly, taking more time to answer a difficult question may have less of an impact on a test driver's grade than taking the same amount of time to answer an easier question. Thus, each question may be ranked or classified in different dimensions. For example, each question may be ranked in two dimensions: 1) difficulty, which may refer to the time and/or mental effort required to provide an answer and 2) importance (as discussed above with respect to ranking), which may refer to the question's ability to differentiate between situationally aware and unaware test drivers. For example, it may be easier to identify whether there was a pedestrian than the number of pedestrians. Examples of a set of questions going from easier to more difficult may include: did vehicle just pass a temporary speed sign? did vehicle correctly adjust its speed? what was the speed limit on a temporary speed sign? (a more difficult question than whether the sign was passed as the driver also needs to remember the value on the sign). In this regard, a particular question may be considered easy but important, such as determining whether there is another vehicle following the vehicle. This question may be considered easy because a simple glance to the rearview mirror could provide the answer when the answer is not previously known, but the question may also be considered important in that a wrong answer would be highly relevant to assessing a test driver's attentiveness or fatigue. As another example, questions relating to whether a pedestrian was observed may be considered more important than questions relating to the number of stop lights at an intersection. As another example, the lack of awareness of a pedestrian may better predict current and future situational awareness, and thus be ranked higher in terms of importance, than questions that relate to lack of awareness of a street name or vice versa. As yet another example, questions that pertain to peripheral or near peripheral objects may be more sensitive to a loss of situational awareness than other questions, and thus, may be ranked higher than those other questions in terms of importance.

In this regard, depending upon the circumstances, the different rankings may be used in different ways. For instance, when the vehicle is in a condition that requires full attention from the test driver, such as when a vehicle is moving on a high speed road or an area with a high density of objects surrounding the vehicle, the driver testing system 100 may ask easier questions rather than more difficult or more important ones. As another instance, when a vehicle is stationary (such as at red light) or moving slowly in an area with no moving objects (25 mph road, no people or vehicles on it or close by), more important questions and/or more difficult questions may be asked as opposed to easier or less important questions. As another instance, when the complexity of the environment is uncertain, the driver testing system 100 may ask easier questions. In such cases where two questions differ in difficulty but have the same importance, the driver testing system may select the question with the lower difficulty. As another instance, if the test river is in a fatigued state or is known to not produce high quality answers, the driver testing system 100 may ask low importance or easier questions over high importance or harder questions, even when there is no safety risk for a test driver. This may enable the driver testing system to maintain a high quality of answers to important questions. As such, the driver testing system may prioritize those questions which should be asked based on the driving circumstances.

The rankings themselves may be determined by human operators based on experience. In some instances, the rankings may be determined using machine learning or statistical modeling. For the machine learning approach, the location, surrounding context, difficulty (pass rate), or type of questions may be used as predictors for future situational awareness or fatigue. Thus, some questions or question-features could be found to better differentiate between those test drivers who are or will continue to be situationally aware and those that are not or will not be. In this regard, the highest rank questions may be those that are allowable within a given driving context, relevant to a given driving context, and are the most likely to differentiate between situationally aware and inattentive driving, as determined by that question's historical performance (e.g. a question's ability to predict whether a test driver will be situationally aware in the next X, Y, Z minutes, etc.).

Of course, the rankings may also be dynamic, that is, the rankings may change. For instance, if a test driver was recently asked a particular type of question, (e.g. related to stop signs or the number of vehicles). Such questions may automatically be ranked lower. For example, if a test driver has been recently asked a question about pedestrians, the question "is there a pedestrian proximate to intersection 704?" may be ranked lower than the question "is there a bicyclist present?"

If there is a greater number of distracted signals or another assessment of fatigue (e.g. based on human review of a video of the test driver or another interactive cognitive test) suggests that the test driver may be fatigued, it may be more appropriate to ask easier questions, and thus, such questions may be ranked higher than hard questions. Similarly, if there is only a small number of distracted signals (e.g. 1 in the last 5 minutes) or another assessment of fatigue (e.g. based on human review of a video of the test driver or another interactive cognitive test) suggests that the test driver may not be fatigued, it may be more appropriate to ask harder questions, and thus, such questions may be ranked higher than easier questions.

As another similar example, if the amount of time to ask and answer a question is expected to be short, easier questions may be ranked higher than harder questions, and vice versa. As such, if the vehicle is stopped at a red light that is expected to shortly turn green, the number of vehicles in front of the vehicle which need to begin to move may dictate how difficult of a question can be asked (e.g. if there are more vehicles, there is more time, and a more difficult question can be asked).

In some instances, each question may be ranked to account for an expected amount of time to answer the question as a third dimension. In this regard, each question can be ranked and selected according to the expected amount of time to each question. Alternatively, all questions with time beyond a threshold may be ranked lower than questions with time that is less than the threshold.

At block 850 of FIG. 8, the question is provided to the test driver. Once a question is identified, it can be presented to the test driver in any number of ways using the user output devices 160. For example, a question may be asked audibly after a short tone or other message to indicate that a question is forthcoming. In addition or alternatively, the questions may be displayed on an internal display of the vehicle. Of course, in such situations, it may be critical that the vehicle is stopped when such questions are asked.

At block 860, input from the test driver providing an answer to the question is received. The test driver's answers may also be inputted in various ways using the user input devices 150. For example, a test driver may speak the answer which may be recorded by a microphone of the user input devices 150. This may provide a faster input of the information, but may have some limitations in terms of data collection and ease of understanding the input. In other words, the audio data would need to be processed to confirm the answer. As another example, the answer may be input using buttons on the steering wheel or a touch screen of the user input devices 150. Buttons on the steering wheel may be most useful, as the test driver may be able to use them without actually having to look at them (e.g. 1 button for yes or a counter for inputting a number and 1 button for no).

Alternatively, rather than using buttons or voice to answer questions, the test driver may provide physical responses which may be recorded and processed using the aforementioned video cameras 170. For example, a question may ask the test driver to look in the direction of a particular object (e.g. a vehicle, bicyclist or pedestrian), look through a particular area of the windshield (e.g. left/right/middle), or some particular region of a field of view (e.g. a visual representation of the left/right/middle which is displayed or illuminated). Such regions may be selected based on where important (e.g. an ambulance or fire truck, or vulnerable road users such as pedestrians or bicyclists) are located.

In some instances, physical responses may even be processed as binary "yes" or "no" inputs from the test driver. For example if the perception system 272 identified a vehicle that is likely a fire truck but with a low confidence, a question that requires the test driver to look in the direction of a fire truck may provide enough data to confirm that the identified vehicle is indeed a fire truck and not ask further questions. Otherwise when driver's physical response is not enough to either confirm or reject a hypothesis (e.g. is it a fire truck?), other types of questions can be asked (as a follow up or as the initial question), such as "Do you see a firetruck? If so, please press a button" or "which type of vehicles do you see around you?"

In some instances, rather than asking particular questions, the testing system may function in a more passive manner. One instance of a "passive" action for the driver testing system may be to label objects and situations based on test driver actions, such as labeling sudden lane changes by other vehicles as "cut ins" when a test driver pushes on a brake pedal or on the opposite trigger an alert or a request for situation review where the test driver is not taking an action otherwise expected (such as that test driver not pushing on a brake pedal during the cut in.

Similarly, the test driver testing system can passively evaluate driver alertness comparing to that test driver's usual action when alert to current action in an identical situation. For example if when alert the test driver typically prefers to take control of the vehicle when a second vehicle cuts off in front of the vehicle within 10 feet, the lack of such taking control in identical situation may suggest the lack of situational awareness caused by fatigue.

As another instance, the vehicle may detect an external object, such as a person, that, were the test driver situationally aware, should be viewed within a specified period of time. In this regard, looking within the gaze region containing this person may be considered answering a question of whether that test driver is aware of that person.

In other instances, test driver's gaze is directed to an object that is not the most appropriate to be watched at the current point in time, the testing system may provide a visual or audible notification to a test driver such as "please be aware of nearby vulnerable users as they may be moving in an unsafe manner" and then watch for test driver's responsive behavior. In this regard, the test driver may actually actively move his or her head to explore the environment and end up looking at an object that is more relevant. For example, if the test driver's gaze is looking away from a bicyclist, the vehicle's computing devices may request that the test driver look at the bicyclist specifically or simply provide the aforementioned notification.

In addition, in many cases, a physical response from a test driver may be both less burdensome (e.g. safer) for the test driver and may also provide a better input for the system than a button-push or a voice command. This may be particularly useful in situations in which the test driver's physical response may be informative to other road agents such as pedestrians as the test driver may be able to provide instructions or simply acknowledge the pedestrian with a simple head and/or hand gesture. This may include notifying a pedestrian that he or she may cross safely, making eye contact to acknowledge that a test driver can see a pedestrian or a bicyclist, etc. In such situations, physical responses can be used to help vehicle's computing devices to assess a test driver's attentiveness or fatigue.

In some instances, the reaction time of the test driver may also be considered. For instance, a test driver who takes longer to answer simple questions may need to gather information to answer that question and can be assumed to not have been aware of the answer prior to the question being posed. As such, this may suggest that the test driver is not situationally aware. In addition, in some instances, reaction times that are longer could prompt more difficult questions to be asked.

The inputted answer may be processed by the computing devices 110 of the driver testing system 100 and then sent to a remote computing device, such as computing devices 210, 510, 520, 530, 540, etc., or simply sent to a remote computing device to be processed. The processing may involve determining whether the answer was correct as well as a reaction time for the test driver inputting the answer. In some instances, the processing may involve determining how the test driver has answered prior questions, or rather, whether the test driver has answered some threshold number of questions incorrectly or it took too long a time for the test driver to provide the input. In some instances, this information as well as the difficulty of the questions may be combined into a grade for the test driver to assess how distracted or not situationally aware the test driver currently is. For instance, if the answering easier questions incorrectly may have less of an impact on a test driver's grade than answering a harder question incorrectly.

Based on the processing and/or grading, an intervention may be initiated by any of the computing devices 110, 210, 510, 520, 530. For instance, if the grade is too low (e.g. below a threshold value) or if there have been too many (e.g. one or more questions answered incorrectly), various different types of intervention responses may be employed. For instance, intervention responses may include providing with supportive options (e.g. suggested breaks of various durations, or suggested or required activities known to promote alertness. This might be covered elsewhere but we could also require a reaction time test to screen for sleep deprivation at this time, which would suggest the lack of situational awareness could be due to sleep-related fatigue and thus resistant to task-based interventions) and, if applicable, task-reassignment. For example, the test driver may be provided with a set of tasks to get the driver more engaged or further evaluate fatigue, distractedness or lack of situational awareness, connected with a remote assistance operator who can interact with the test driver, or even relieved of the duty of monitoring a vehicle for a current shift (e.g. asked to return to a depot or have the vehicle pulled over). Other intervention responses may include simply asking additional questions, such as when the grade is within some range of the threshold. This may involve rerouting the vehicle to areas that are appropriate for asking questions, such as lower density quiet neighborhoods where more difficult questions can be asked, etc.

Answers to questions may also be used to help various systems of the vehicle 200 to better classify objects. For instance, some test drivers may be given different questions or directions (or none) when they pass a given area so the difference in driver physical responses may inform classification models. For example, when a vehicle is passing a school zone some drivers may be asked to pay special attention to children on bicycles, groups of more than one child, children not accompanied by adults etc. while other drivers do not get such direction. As a result, the gaze trajectory for drivers with a direction should be different from a gaze trajectory for drivers without a direction and this difference may be an input to object classification algorithms. Such difference may also be an input into driver fatigue model where the difference between driver behavior with a direction vs with no direction may help estimate driver attentiveness, distraction, fatigue, etc.

In addition, when gaze trajectories of a first group of test drivers with directions deviate noticeably from gaze trajectories of a second group test drivers without directions, this may suggest there are "active" circumstances (e.g. children playing, groups of pedestrians, a high-volume of traffic, etc.) in the area that allow marking the area as "higher risk" and be used to block some vehicles and/or test drivers from visiting the area. Such as vehicles with software known to have issues with identifying certain types of object. When gaze trajectories in the first and second groups are indistinguishable, this may suggest that there are no "active" circumstances in the area. As such, the area can be open to vehicles and/or test drivers who would otherwise (e.g. were there "active" circumstances) not be permitted to drive there.

In addition, gaze data can be used to further inform questions asked to the test drivers. For instance, when a long stare at a group of people happens, the driver testing system 100 could ask questions in order to help more appropriately label the group.

In some instances, questions may be asked of a test driver to determine whether such questions are appropriate for future use. In other words, the vehicle's computing devices may ask questions that the vehicle may or may not be able to figure out the answers to in advance, such as whether a pedestrian is a child or an adult, in order to determine whether such questions are appropriate for asking or in order to enable the use of the answers to such questions to inform later classifications or even later questions. For such questions, the reaction time, and whether or not the question was responded to would be the only relevant situational awareness markers. In other words, when the answer to the question is unknown, the correctness of the answer cannot be known and therefore cannot be used to assess situational awareness.

The features described herein may provide for a reliable and effective system for identifying and responding to distracted or with insufficient situational awareness persons tasked with monitoring the driving of a vehicle operating in an autonomous driving mode.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of testing situational awareness of a test driver tasked with monitoring a vehicle operating in an autonomous driving mode, the method comprising:
   identifying, by one or more processors, a signal that indicates that the test driver may be distracted, wherein the signal relates to a lack of feedback provided by input into a user input device of the vehicle after a certain type of event;
   based on the signal, determining, by the one or more processors, that a question can be asked of the test driver;
   identifying, by the one or more processors, a plurality of factors relating to a driving context for the vehicle;
   based on the determination, generating, by the one or more processors, a question based on the plurality of factors;
   providing, by the one or more processors, the question to the test driver;
   receiving, by the one or more processors, input from the test driver providing an answer to the question; and
   initiating, by the one or more processors, an intervention response based on whether the answer is correct.

2. The method of claim 1, further comprising, identifying a second signal indicating that the test driver may not be distracted, and wherein determining that a question can be asked is further based on the second signal.

3. The method of claim 2, wherein the second signal includes the test driver inputting feedback about the vehicle's driving into the user input device.

4. The method of claim 2, wherein the second signal includes the test driver taking manual control of the vehicle.

5. The method of claim 2, wherein the second signal includes the test driver inputting details about an object in an environment of the vehicle into the user input detail.

6. The method of claim 1, wherein, when there is feedback provided by the test driver after the certain type of event, the signal further relates to the feedback that is inconsistent with feedback provided by a passenger of the vehicle after the certain type of event, the passenger being an occupant of the vehicle other than the test driver.

7. The method of claim 1, wherein the signal relates to the lack of feedback when there is feedback input device by a passenger of the vehicle after the certain type of event, the passenger being an occupant of the vehicle other than the test driver.

8. The method of claim 1, wherein the determining that a question can be asked is further based on whether a threshold number of signals that indicates that the test driver may be distracted have been identified.

9. The method of claim 1, wherein the determining that a question can be asked is further based on whether pre-stored map information indicates that the vehicle is currently within an area where questions are not to be asked.

10. The method of claim 1, wherein the determining that a question can be asked is further based on a current speed of the vehicle.

11. The method of claim 1, wherein the determining that a question can be asked is further based on a number of road users detected in an environment of the vehicle.

12. The method of claim 1, wherein the determining that a question can be asked is further based on whether another object in an environment of the vehicle is performing a certain type of maneuver.

13. The method of claim 1, wherein the determining that a question can be asked is further based on whether the vehicle is performing a certain type of maneuver.

14. The method of claim 1, wherein the plurality of factors is identified further based on objects detected by a perception system of the vehicle.

15. The method of claim 1, wherein the plurality of factors is identified further based on pre-stored map information used to control the vehicle in the autonomous driving mode.

16. The method of claim 1, wherein the generating the question includes generating an answer to the question based on the plurality of factors.

17. The method of claim 1, wherein the generating the question includes:
   identifying an initial set of predefined questions;
   ranking the initial set; and
   selecting the question from the ranked initial set.

18. The method of claim 17, wherein the ranking is based on predetermined values associated with the predefined questions.

19. The method of claim 18, wherein the predetermined values correspond to difficulty of questions.

20. The method of claim 19, wherein the ranking is further based on an amount of time expected to be available to ask and receive user input providing an answer to the question.

21. The method of claim 1, further comprising, processing the input to determine whether the answer was correct.

22. The method of claim 21, further comprising, sending the determination of whether the answer was correct to a remote computing device.

* * * * *

UNITED STATES PATENT AND TRADEMARK OFFICE
CERTIFICATE OF CORRECTION

PATENT NO. : 12,024,206 B2
APPLICATION NO. : 16/928630
DATED : July 2, 2024
INVENTOR(S) : Keith Hutchings, Ilmo van der Lowe and Vasily Starostenko It is certified that error appears in the above-identified patent and that said Letters Patent is hereby corrected as shown below:

In the Claims

Claim 5, Column 19, Line 60:
Now reads: "user input detail" should read -- user input device --

Signed and Sealed this
Thirteenth Day of August, 2024

Katherine Kelly Vidal
*Director of the United States Patent and Trademark Office*